US011238605B2

(12) United States Patent
Chen

(10) Patent No.: US 11,238,605 B2
(45) Date of Patent: Feb. 1, 2022

(54) SIMULTANEOUS LOCALIZATION AND MAPPING METHOD, COMPUTER DEVICE, AND STORAGE MEDIUM

(71) Applicant: Tencent Technology (Shenzhen) Company Limited, Shenzhen (CN)

(72) Inventor: Chao Chen, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 16/931,155

(22) Filed: Jul. 16, 2020

(65) Prior Publication Data

US 2020/0349730 A1 Nov. 5, 2020

Related U.S. Application Data

(63) Continuation of application No. PCT/CN2019/077173, filed on Mar. 6, 2019.

(30) Foreign Application Priority Data

Apr. 26, 2018 (CN) .......................... 201810385608.9

(51) Int. Cl.
*G06T 7/00* (2017.01)
*G06T 7/579* (2017.01)
(Continued)

(52) U.S. Cl.
CPC .......... *G06T 7/579* (2017.01); *G05D 1/0274* (2013.01); *G06T 7/13* (2017.01); *G06T 7/74* (2017.01)

(58) Field of Classification Search
None
See application file for complete search history.

(56) References Cited

U.S. PATENT DOCUMENTS

2014/0350839 A1* 11/2014 Pack .................... G05D 1/0214
  701/409
2019/0145775 A1* 5/2019 Cui .......................... G06F 16/29
  701/446

FOREIGN PATENT DOCUMENTS

CN 103886107 A 6/2014
CN 104077809 A 10/2014
(Continued)

OTHER PUBLICATIONS

International Search Report and Written Opinion for International Patent Application No. PCT/CN2019/077173 dated May 27, 2019; 12 pages.

*Primary Examiner* — Delomia L Gilliard
(74) *Attorney, Agent, or Firm* — Crowell & Moring LLP

(57) ABSTRACT

Embodiments of this application disclose a method, a computer device, and a storage medium for simultaneous localization and mapping, applied to the field of information processing technologies. In the simultaneous localization and mapping method in the embodiments, edge information of a current frame image captured by an image capturing apparatus is obtained, and the edge information is divided into structural features of a plurality of first components, where each first component may correspond to a partial structure of one object in the current frame image, or correspond to at least one object. Then, a correspondence between first components in the current frame image and second components in a reference frame image may be obtained by matching the structural features of the first components with structural features of the second components in the reference frame image. Finally, the image capturing apparatus may be simultaneously localized according to the correspondence.

18 Claims, 9 Drawing Sheets

(51) Int. Cl.
*G06T 7/73* (2017.01)
*G06T 7/13* (2017.01)
*G05D 1/02* (2020.01)

(56) References Cited

FOREIGN PATENT DOCUMENTS

| CN | 106875722 A | 6/2017 |
| CN | 107633526 A | 1/2018 |
| CN | 107742311 A | 2/2018 |
| CN | 107907131 A | 4/2018 |
| CN | 108665508 A | 10/2018 |

* cited by examiner

SIMULTANEOUS LOCALIZATION AND MAPPING METHOD, COMPUTER DEVICE, AND STORAGE MEDIUM

RELATED APPLICATION

This application is a continuation application of the International PCT Application No. PCT/CN2019/077173, filed with the China National Intellectual Property Administration, PRC on Mar. 6, 2019 which claims priority to Chinese Patent Application No. 201810385608.9, entitled "SIMULTANEOUS LOCALIZATION AND MAPPING METHOD, APPARATUS, AND STORAGE MEDIUM" and filed with the China National Intellectual Property Administration, PRC on Apr. 26, 2018, which are incorporated herein by reference in their entireties.

FIELD OF THE TECHNOLOGY

This application relates to the field of information processing technologies, and in particular, to a method, a computer device, and a storage medium for implementing simultaneous localization and mapping.

BACKGROUND OF THE DISCLOSURE

Currently, a feature-based visual simultaneous localization and mapping (SLAM) technology is a technology of processing an image collected by a camera, to implement simultaneous localization of the camera and environment mapping. An existing visual SLAM method is mainly an oriented features from accelerated segment test and rotated binary robust independent elementary features (ORB) SLAM method, or a point and line feature-based SLAM (PL-SLAM) method.

The ORB-SLAM method is an SLAM algorithm based on ORB features, and mainly includes extracting ORB features from images, and then performing matching on ORB features in each frame of image, to implement calculation of a location and posture of a camera and environment map construction. The PL-SLAM method is established based on the ORB-SLAM method. Based on ORB point features in images, line features are combined, and matching is performed on point and line features of each frame of image, to implement more precise and more reliable localization and mapping.

Currently, in the visual SLAM method based on image point features or line features, the features include a relatively small amount of information. Consequently, reliability of a single feature is relatively low, and false matching occurs easily. For example, the PL-SLAM algorithm uses points and lines as features, and the features only include information about areas adjacent to corners and line segments in an image, which is difficult to be distinguished from similar corners and line segments in other areas in the image, thus usually resulting in false matching.

In the meanwhile, due to low reliability of a single feature, a large quantity of features need to be extracted from the image. Therefore, a large calculation amount is needed when feature matching is performed between two frames of images. For example, in the PL-SLAM algorithm, generally, tens or hundreds of features need to be extracted in each frame of image. Therefore, feature matching is performed between a quantity of feature points in a current frame image and a similar quantity of feature points in a reference frame image, thus causing a large amount of calculation.

SUMMARY

In view of this, embodiments of this application provide a simultaneous localization and mapping method, a computer device, and a storage medium.

An embodiment of this application provides a simultaneous localization and mapping method, including: obtaining edge information of a current frame image captured by an image capturing apparatus, the edge information including information about a plurality of edge curves and/or information about edge key points; determining structural features of first components in the current frame image according to the obtained edge information, a structural feature of each first component including information about at least one edge curve and/or information about edge key points on the at least one edge curve; obtaining structural features of second components in a reference frame image captured by the image capturing apparatus; matching the structural features of the first components with the structural features of the second components, to obtain a correspondence between the second components and the first components; and simultaneously localizing the image capturing apparatus according to the correspondence.

Another embodiment of this application provides a computer device, including a processor and a memory, the memory storing computer-readable instructions, the computer-readable instructions, when executed by the processor, causing the processor to perform the following operations: obtaining edge information of a current frame image captured by an image capturing apparatus, the edge information including information about a plurality of edge curves and/or information about edge key points; determining structural features of first components in the current frame image according to the obtained edge information, a structural feature of each first component including information about at least one edge curve and/or information about edge key points on the at least one edge curve; obtaining structural features of second components in a reference frame image captured by the image capturing apparatus; matching the structural features of the first components with the structural features of the second components, to obtain a correspondence between the second components and the first components; and simultaneously localizing the image capturing apparatus according to the correspondence.

Still another embodiment of this application provides a non-volatile computer-readable storage medium, storing a computer-readable instruction, the computer-readable instruction, when executed by one or more processors, causing the one or more processors to perform the following operations: obtaining edge information of a current frame image captured by an image capturing apparatus, the edge information including information about a plurality of edge curves and/or information about edge key points; determining structural features of first components in the current frame image according to the obtained edge information, a structural feature of each first component including information about at least one edge curve and/or information about edge key points on the at least one edge curve; obtaining structural features of second components in a reference frame image captured by the image capturing apparatus; matching the structural features of the first components with the structural features of the second components, to obtain a correspondence between the second components and the first components; and simultaneously localizing the image capturing apparatus according to the correspondence.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and a person of ordinary skill in the art may derive other drawings from the accompanying drawings without creative efforts.

DESCRIPTION OF EMBODIMENTS

Figure 1:
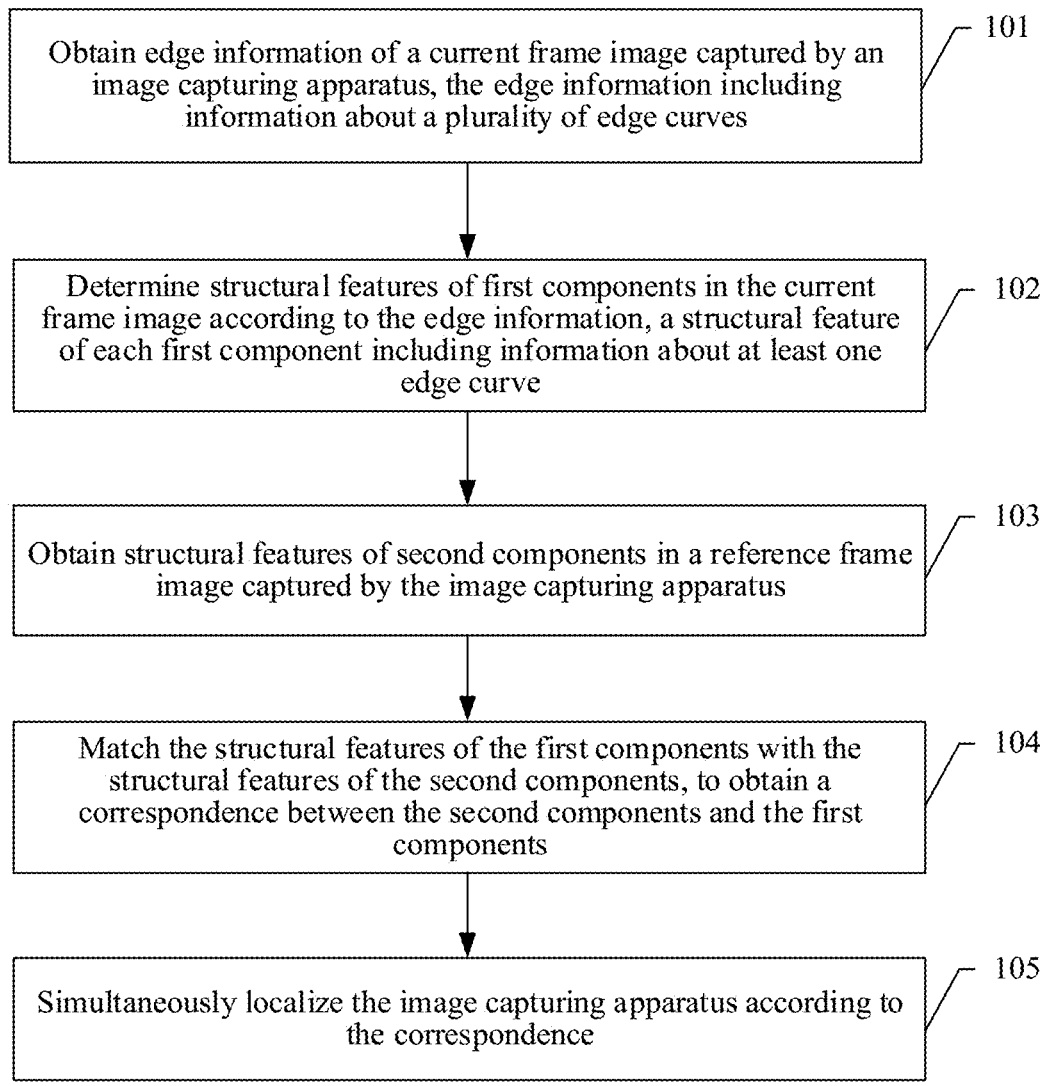
FIG. 1 is a flowchart of a simultaneous localization and mapping method according to an embodiment of this application.

To make the objectives, technical solutions, and advantages of this application clearer, the following further describes this application in detail with reference to the accompanying drawings. Apparently, the described embodiments are merely some but not all of the embodiments of this application. All other embodiments obtained by a person of ordinary skill in the art based on the embodiments of this application without creative efforts shall fall within the protection scope of this application.

An embodiment of this application provides a simultaneous localization and mapping method, that is, a visual SLAM method based on structural features of components. The method may be mainly applied to a simultaneous localization and mapping apparatus, and the apparatus is in communication with an image capturing apparatus (such as a camera). The image capturing apparatus captures images in an ambient environment of the image capturing apparatus according to a specific period. After the image capturing apparatus captures one frame of image, the simultaneous localization and mapping apparatus initiates the following simultaneous localization and mapping method for the frame of image (that is, current frame image in the descriptions below):

obtaining edge information of a current frame image captured by an image capturing apparatus, the edge information including information about a plurality of edge curves and/or information about edge key points; determining structural features of first components in the current frame image according to the obtained edge information, a structural feature of each first component including information about at least one edge curve and/or information about edge key points on the at least one edge curve; obtaining structural features of second components in a reference frame image captured by the image capturing apparatus; matching the structural features of the first components with the structural features of the second components, to obtain a correspondence between the second components and the first components; and simultaneously localizing the image capturing apparatus according to the correspondence.

In an actual application, the foregoing simultaneous localization and mapping apparatus may be a smart mobile device, such as a robot. In such a scenario, the foregoing image capturing apparatus is fixedly mounted on the simultaneous localization and mapping apparatus. In another scenario, the foregoing image capturing apparatus may be mounted on a to-be-localized mobile device other than the simultaneous localization and mapping apparatus.

In this way, a structural feature of one first component obtained in this embodiment of this application includes information about at least one edge curve and/or information about edge key points on the at least one edge curve, so that objects in an image are described more accurately, and matching between structural features of components is more reliable, thereby improving accuracy of simultaneous localization. Furthermore, a structural feature of each first component may describe a partial structure of one object in the current frame image, or the structure of at least one object, and generally, one frame of image does not include many objects. Therefore, not many structural features of first components are obtained, so that a calculation amount in the subsequent matching process is relatively low.

An embodiment of this application provides a simultaneous localization and mapping method. The method is mainly performed by the simultaneous localization and mapping apparatus in communication with the image capturing apparatus, and a flowchart is shown in FIG. 1, including:

Step 101. Obtain edge information of a current frame image captured by an image capturing apparatus, the edge information including information about a plurality of edge curves.

It may be understood that, after the image capturing apparatus in communication with the simultaneous localization and mapping apparatus captures one frame of image (that is, the current frame image), the simultaneous localization and mapping apparatus may be initiated to perform a procedure from step 101 to step 105 in this embodiment.

For simple objects in the current frame image, the foregoing edge information refers to information about pixel points on contour lines of the objects in the current frame image, and may specifically include information such as coordinate information and pixel values of the pixel points. For a complex object in the current frame image, edge information of the object may further include information about pixel points in an interior texture of the object, for example, a flower on the desktop of one desk in the current frame image may be a texture of the desktop of the desk. An object in the current frame image may represent an actual object, such as a person or a cabinet.

The edge information may have a plurality of forms. In this embodiment, the edge information specifically includes information about a plurality of edge curves. Specifically, the simultaneous localization and mapping apparatus may detect the current frame image by using an edge detection algorithm such as a computational theory of edge detection established by Canny, to obtain the information about the plurality of edge curves. Information about each edge curve includes information about a plurality of adjacent pixel points forming the edge curve, for example, coordinate information of the plurality of pixel points, a shape of a curve formed by the plurality of adjacent pixel points, and other information.

For an object in the current frame image, edge information of the object may include information about at least one edge curve on a contour line and in an interior texture of the object. The at least one edge curve may be a closed curve, a line segment, a curve that is not completely closed, or the like.

For example, the current frame image includes a desk placed on the ground. After this step is performed, at least one edge curve of the desktop of the desk and at least one edge curve on contour lines of desk legs may be obtained.

After performing step 101, the simultaneous localization and mapping apparatus may directly perform step 102. Or alternatively, after step 101 is performed, the information about the plurality of edge curves is pre-processed, and then step 102 is performed based on the pre-processed information about the edge curves. The pre-processing may include, but is not limited to, the following processing: filtering the information about the plurality of edge curves, that is, an operation of removing information about some edge curves (for example, a first edge curve) that do not satisfy a preset condition. The preset condition herein may include: the quantity of pixel points included in an edge curve exceeds a threshold, or the like. The threshold may be preset and adjusted later.

Step 102. Determine structural features of a plurality of (at least two) first components in the current frame image according to the edge information obtained in step 101, a structural feature of each first component including information about at least one edge curve.

The structural feature of each first component herein may describe a partial structure (such as the head or other part of the body of a person) of one object in a current frame image, or may describe the entire structure of one object, or structures of a plurality of objects. In this way, the structural feature of each first component includes the information about the at least one edge curve. For an independent object included in the current frame image, the independent object may be described by using structural features of one or more first components through operations of steps 101 and 102. If one object in the current frame image is connected to another object, the two connected objects may be described by using a structural feature of one first component through the operations of steps 101 and 102.

Specifically, the simultaneous localization and mapping apparatus may directly use information about one edge curve obtained by using step 101 as a structural feature of one first component, or use information about a plurality of adjacent edge curves in the plurality of edge curves as a structural feature of one first component.

Step 103. Obtain structural features of second components in a reference frame image captured by the image capturing apparatus. The reference frame image will be describe in detail in the paragraph below.

Specifically, after initiating the procedure of this embodiment for the current frame image, the simultaneous localization and mapping apparatus may obtain structural features of second components according to the method in steps 101 and 102. Alternatively, in a process of performing the method in this embodiment on the reference frame image, structural features of second components have been obtained already, and have been stored in the simultaneous localization and mapping apparatus. After initiating the procedure of this embodiment for the current frame image, the simultaneous localization and mapping apparatus directly extracts the structural features of the second components from a local storage. The simultaneous localization and mapping apparatus may store the obtained structural features of the second components locally or remotely.

The reference frame image herein refers to a previous frame image of the current frame image, or an $n^{th}$ (n is greater than 1) frame image prior to the current frame image, or the like, and needs to be determined according to images captured by the image capturing apparatus. If the previous frame image is relatively blur, the previous $n^{th}$ frame image that is relatively clear may be selected as the reference frame image.

In particular, in a case that the current frame image is the first frame image captured by the image capturing apparatus, and the reference frame image is to be determined, if map data of a current location is stored in the local storage of the simultaneous localization and mapping apparatus, an image of the current location in the map data may be used as the reference frame image. If the map data of the current location is not stored in the local storage of the simultaneous localization and mapping apparatus, the operations of steps 103 to 105 are not performed on the current frame image.

Step 104. Match the structural features of the first components with the structural features of the second components, to obtain a correspondence between the second components and the first components.

Specifically, for a structural feature of a first component, the simultaneous localization and mapping apparatus may respectively match the structural feature of the first component with the structural feature of each second component. In a case that the structural feature of the first component matches a structural feature of a second component, the second component in the reference frame image corresponding to the first component in the current frame image may be obtained.

In a case that a structural feature of a first component does not match a structural feature of any second component, it indicates that the first component in the current frame image does not exist in the reference frame image. It is possible that a part where the first component is located exceeds the boundary of the current frame image in a moving process of the image capturing apparatus, or excessive structural features of the first component are determined in step 102, and therefore a structure of an object included in the current frame image cannot be well described. In this case, if the structural feature of the first component includes information about a plurality of edge curves, the simultaneous localization and mapping apparatus may split the structural feature of the first component determined in step 102, to obtain structural features of a plurality of split components. Then, the matching operation in step 104 is performed on the structural feature of each split component, that is, the structural features of the split components are respectively matched with the structural features of the second components. In this way, a correspondence between the split components and the second components may be obtained.

During splitting of the structural feature of the first component, in a case that the structural feature of the first component includes information about m (m is greater than 1) edge curves, the structural feature of the first component may be split into structural features of m split components at the most. A structural feature of a split component may include information about one edge curve, or may include information about p (p is less than m) adjacent edge curves.

When a structural feature of a first component is matched with a structural feature of a second component, it is mainly to compare corresponding information in the structural feature of the second component with at least one of the following information in the structural feature of the first component: attributes such as a shape and curvature formed by at least one edge curve, the quantity of pixel points included in the at least one edge curve, and the like. If a comparison result of at least x pieces of information is that a difference between information in the structural feature of the first component and corresponding information in the structural feature of the second component is relatively large, for example, a difference between quantities of pixel points is greater than a preset value, the structural feature of the first component does not match the structural feature of the second component, where x is a natural number greater than 1.

Step 105. Simultaneously localize the image capturing apparatus according to the correspondence obtained in step 104.

Specifically, for a first component and a second component that have a correspondence, the simultaneous localization and mapping apparatus may compare a location of the first component in the current frame image with a location of the second component in the reference frame image, to determine motion information of the image capturing apparatus during the image capturing apparatus captures the reference frame image and the current frame image, for example, rotation information and translation information, that is, posture information of the image capturing apparatus. The simultaneous localization and mapping apparatus may further determine current location information of the image capturing apparatus according to the foregoing determined motion information with reference to environment map information preset in the simultaneous localization and mapping apparatus. In this way, a location and a posture, that is, the posture information and the location information, of the image capturing apparatus are obtained.

It may be seen that, in the simultaneous localization and mapping method in this embodiment, edge information of a current frame image captured by an image capturing apparatus needs to be obtained, and the edge information is divided into structural features of a plurality of first components, where each first component may correspond to a partial structure of one object in the current frame image, or correspond to at least one object. Then, a correspondence between the first components in the current frame image and second components in a reference frame image may be obtained by matching the structural features of the first components with structural features of the second components in the reference frame image. Finally, the image capturing apparatus may be simultaneously localized according to the correspondence. A structural feature of one first component obtained in this embodiment of this application includes information about at least one edge curve, so that objects in an image are described more accurately, and matching between structural features of components is more reliable, thereby improving accuracy of simultaneous localization. Further, a structural feature of each first component may describe a partial structure of one object in the current frame image, or the structure of at least one object, and generally, one frame of image does not include many objects. Therefore, not many structural features of first components are obtained, and a calculation amount and effort in the subsequent matching process is relatively low.

In a specific embodiment, the simultaneous localization and mapping apparatus may perform the matching step in step 104 in a top-down matching manner as follows:

determining ranking values of the structural features of the first components and the structural features of the second components to be respectively calculated values of corresponding edge information; respectively ranking the structural features of the first components and ranking the structural features of the second components according to the ranking values; and sequentially matching the structural feature of each first component with the structural features of the second components according to a descending order of the ranking values.

In this embodiment, because the edge information includes information about a plurality of edge curves, a ranking value herein may be a length of a corresponding edge curve. Alternatively, because a structural feature of one first component may include information about a plurality of edge curves, a sum of lengths of the plurality of edge curves may be used as a ranking value of the structural feature of the first component. In this way, the structural feature of each first component corresponds to one ranking value respectively, and the structural feature of each second component also corresponds to one ranking value respectively.

Figure 2:
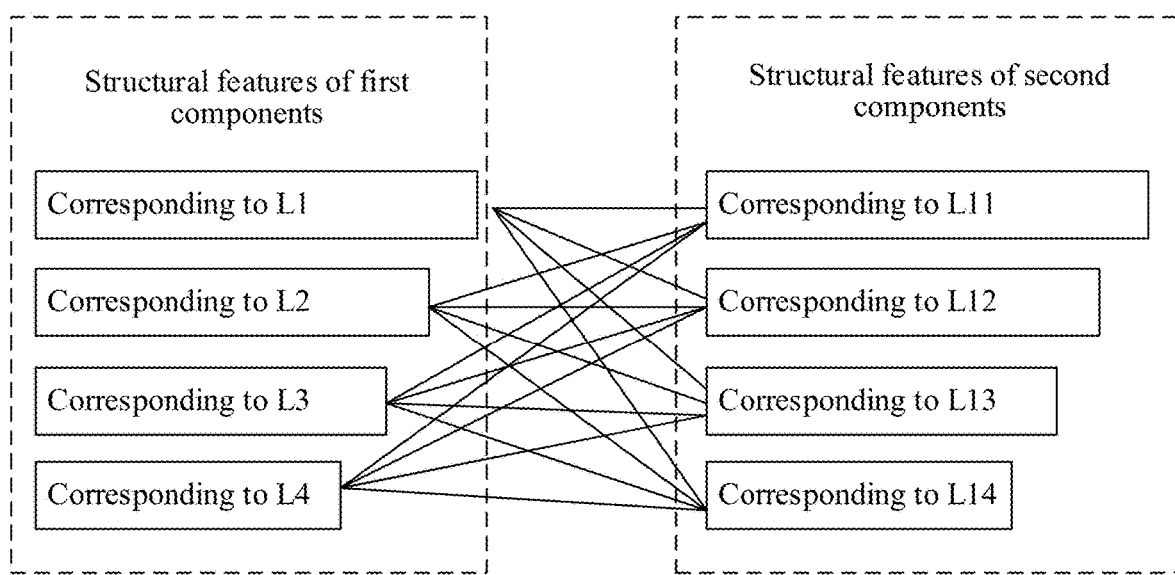
FIG. 2 is a schematic diagram of performing matching between structural features according to an embodiment of this application.

For example, as shown in FIG. 2, structural features of 4 first components are obtained through step 102, and the structural features of the 4 first components are ranked according to a descending order of ranking values, to obtain the sequence. As shown in FIG. 2, the structural features of the first components corresponding to ranking values L1, L2, L3, and L4 respectively.

Structural features of 4 second components are obtained through step 103, and the structural features of the 4 second components are ranked according to a descending order of ranking values, to obtain the sequence. As shown in FIG. 2, the structural features of the second components corresponding to ranking values L11, L12, L13, and L14 respectively. In this way, when matching is performed, a structural feature of a first component corresponding to the ranking value L1 is first sequentially matched with the structural features of the second components respectively corresponding to the ranking values L11, L12, L13, and L14; then, a structural feature of a first component corresponding to the ranking value L2 is sequentially matched with the structural features of the second components respectively corresponding to the ranking values L11, L12, L13, and L14, and so on. The matching process continue till the last ranking value and the matching iteration will break out to the next iteration if a matching is found. In FIG. 2, the structural features of the second components with different ranking values and the structural features of the first components with different ranking values are represented by using squares of different lengths.

In this way, based on two sorted ranking value lists, the simultaneous localization and mapping apparatus may preferentially match a structural feature of a first component with a relatively large ranking value with a structural feature of a second component with a relatively large ranking value. An object indicated by the structural feature of the first component with the relatively large ranking value is an object with a relatively large structure in the current frame image. The object may correspond to an object with a relatively large structure in the reference frame image. That is, the structural feature of the first component corresponding to the object may match the structural feature of the second component with the relatively large ranking value in the reference frame image. Therefore, by ranking the structural features of the first components and the structural features of the second components and then sequentially matching the structural features according to a descending order of the ranking values, the second components corresponding to the first components can be quickly found.

In another specific embodiment, before performing the matching operation in step 104, the simultaneous localization and mapping apparatus further obtains sensing information of a sensor other than the image capturing apparatus, for example, information sensed by an odometer, an inertial measurement unit (IMU), or the like, and predicts, in the reference frame image according to the received sensing information, areas of second components corresponding to the first components.

In this way, when step 104 is performed, the structural features of the first components may not be respectively matched with the structural feature of each second component; instead, the structural features of the first components are only matched with structural features of second components in the predicted areas, thereby further reducing a calculation amount in the matching process.

For example, the sensing information of the IMU is rotating a certain angle horizontally leftward. Therefore, for an object in a central area of the current frame image, the object may be located in a left area in the reference frame image, so that a structural feature of a first component corresponding to the object may be matched with structural features of second components in the left area in the reference frame image.

Other sensors and the image capturing apparatus are all mounted directly or indirectly on a same mobile device.

Furthermore, in other specific embodiments, after performing step 102, that is, determining the structural features of the first components, the simultaneous localization and mapping apparatus may further perform loop closure detection.

Specifically, the simultaneous localization and mapping apparatus obtains structural features of third components in a history key frame image, then matches the structural features of the first components with the structural features of the third components, to obtain a matching result, and determines, according to the matching result, whether the image capturing apparatus has been at a current location before, to update map information in a local storage.

The history key frame image is an image captured by the image capturing apparatus in a moving process, and may be one frame of image, or may be a plurality of frames of images, that is, the history key frame image is at least one frame of image before the current frame image. In a specific implementation, in a process of capturing an image, the image capturing apparatus may select one frame of image as the history key frame image according to a certain cycle, and store the history key frame image in the local storage. For example, after capturing 5 frame images each time, the image capturing apparatus uses a next frame image as a history key frame image.

For a method of obtaining the structural features of the third components, and matching the structural features of the first components with the structural features and the third components by the simultaneous localization and mapping apparatus, refer to descriptions in the foregoing embodiment. Details are not described herein. If there are a plurality of history key frame images, the simultaneous localization and mapping apparatus respectively matches structural features of third components in each frame of image with the structural features of the first components.

The matching result obtained by the simultaneous localization and mapping apparatus after the matching operation may include information about whether the structural features of the first components match structural features of third components in a history key frame image. Further, in a case that structural features of at least t first components match structural features of third components in a history key frame image, it may be determined that the image capturing apparatus has been at the current location before. t is a natural number greater than or equal to 1, and a specific value oft herein may be set according to an actual application.

Furthermore, after determining that the image capturing apparatus has been at the current location before, the simultaneous localization and mapping apparatus may update the map information in the local storage according to the structural features of the first components in the current frame image. Specifically, if an object corresponding to a structural feature of a first component in the current frame image is not included in the map information in the local storage, and it is determined that the object is a static object, information about the object is added to the map information. If an object corresponding to a structural feature of a first component in the current frame image is not consistent with object information in the map information, and it is determined that the object is a static object, the object information in the map information is replaced with the structural feature of the first component.

Figure 3:
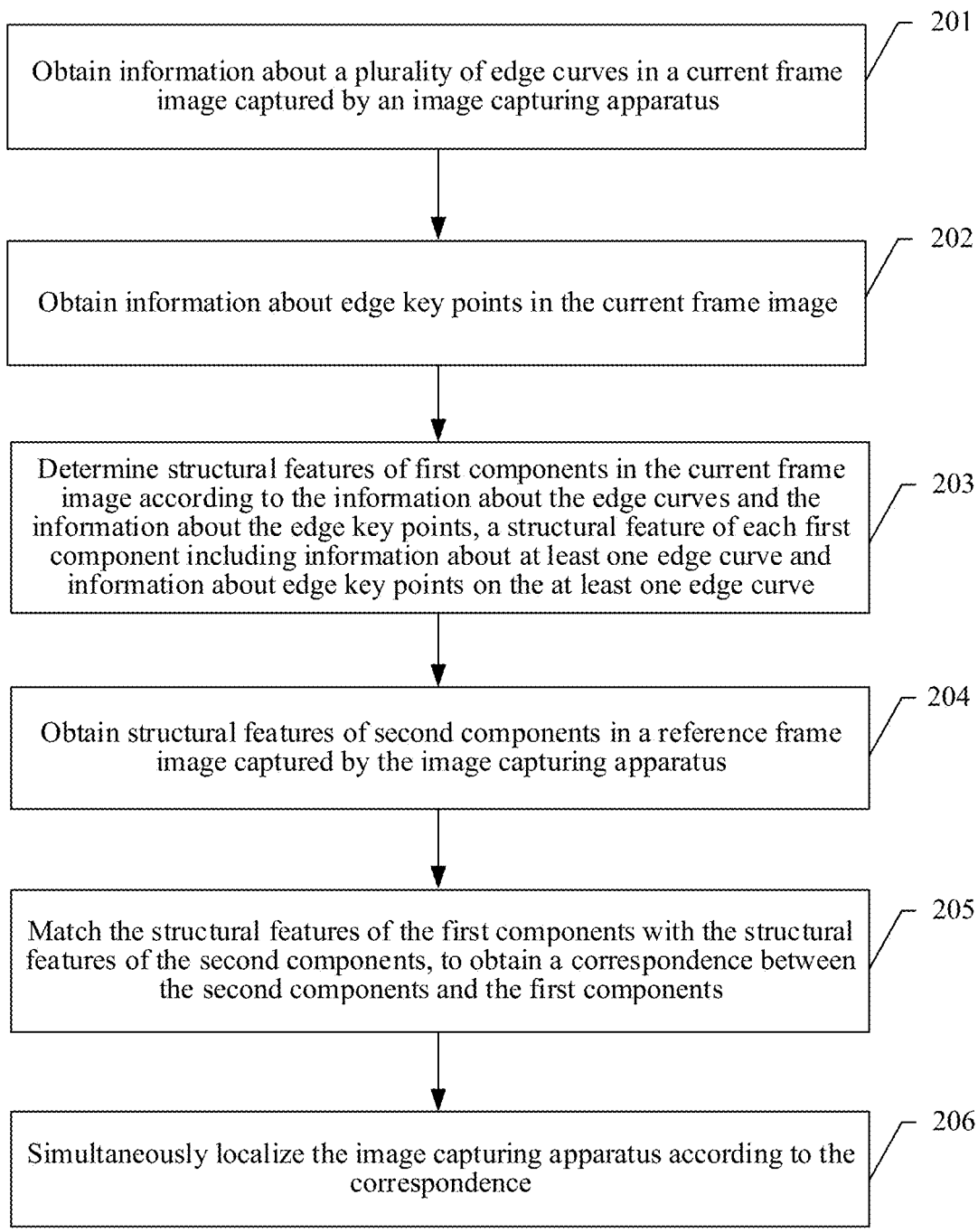
FIG. 3 is a flowchart of a simultaneous localization and mapping method according to another embodiment of this application.

Another embodiment of this application provides a simultaneous localization and mapping method. The method is mainly performed by the simultaneous localization and mapping apparatus in communication with the image capturing apparatus, and is similar to the procedure shown in FIG. 1. A difference is in that edge information of a current frame image obtained in this embodiment not only includes information about edge curves but also includes information about edge key points in the current frame image. A method flowchart in this embodiment is shown in FIG. 3, and includes the following steps:

Step 201. Obtain information about a plurality of edge curves in a current frame image captured by an image capturing apparatus.

It may be understood that, after the image capturing apparatus in communication with the simultaneous localization and mapping apparatus captures one frame of image (that is, the current frame image), the simultaneous localization and mapping apparatus may be initiated to perform a procedure from step 201 to step 206 in this embodiment.

Step 202. Obtain information about edge key points in the current frame image.

Specifically, when obtaining the information about the edge key points, the simultaneous localization and mapping apparatus may detect the edge key points in the current frame image by using an algorithm such as Features from Accelerated Segment Test (FAST) corner detection, or Harris corner detection, to obtain the information about the edge key points. For simple objects in the current frame image, information about edge key points is mainly information about turning pixel points on contour lines of the objects in the current frame image, and may specifically include information such as coordinate information and pixel values of the pixel points. For a complex object in the current frame image, information about edge key points of the object may further include information about pixel points in an interior texture of the object. The turning pixel point refers to a pixel point such as an inflection point on a contour line, or a tangent point.

When this step is performed, the simultaneous localization and mapping apparatus may directly process the current frame image, thereby obtaining the information about the edge key points. In an ideal situation, the edge key points herein need to be located on the edge curves obtained through detection in step 201. However, due to potential difference in an actual calculation process, information about some edge key points obtained herein may not be included in the information about the edge curves detected in step 201. In such a scenario, the information about the edge key points may be kept, and a fuzzy connection is established between the edge key points and a nearest edge curve.

In another scenario, when obtaining the information about the edge key points, the simultaneous localization and mapping apparatus may directly select information about some pixel points in the edge curves obtained in step 201 as the information about the edge key points.

After performing step 202, the simultaneous localization and mapping apparatus may directly perform step 203. Or alternatively, after step 202 is performed, the information about the plurality of edge curves and the information about the edge key points (that is, edge information) are pre-processed, and then step 203 is performed based on the edge information obtained after pre-processing. The pre-processing may include, but is not limited to, the following processing: filtering the information of the plurality of edge curves and the information about the edge key points, that is, an operation of removing information about some edge curves (for example, first edge curves) and information about corresponding edge key points that do not satisfy a preset condition. The preset condition herein may include: the quantity of pixel points included in an edge curve exceeds a threshold, or the like. The threshold may be preset and adjusted later.

Step 203. Determine structural features of first components in the current frame image according to the information about the edge curves obtained in step 201 and the information about the edge key points obtained in step 202, a structural feature of each first component including information about at least one edge curve and information about edge key points on the at least one edge curve.

It may be understood that, a structural feature of one first component includes information about at least one edge curve obtained in step 201, and further includes information about edge key points on the at least one edge curve obtained in step 202. In some cases, information about other edge key points that establish a fuzzy connection with the at least one edge curve is further included, thereby supplementing the structural feature of the first component, so that objects in the current frame image are described more accurately.

Step 204. Obtain structural features of second components in a reference frame image captured by the image capturing apparatus.

Step 205. Match the structural features of the first components with the structural features of the second components, to obtain a correspondence between the second components and the first components.

Specifically, for a structural feature of a first component, the simultaneous localization and mapping apparatus may respectively match the structural feature of the first component with the structural feature of each second component. In a case that the structural feature of the first component matches a structural feature of a second component, the second component in the reference frame image corresponding to the first component in the current frame image may be obtained.

In a case that a structural feature of a first component does not match a structural feature of any second component, and further, if the structural feature of the first component includes information about a plurality of edge curves and information about edge key points on the plurality of edge curves, the simultaneous localization and mapping apparatus may split the structural feature of the first component determined in step 203, to obtain structural features of a plurality of split components. Then, the matching operation in step 205 is performed on the structural feature of each split component.

When a structural feature of a first component is matched with a structural feature of a second component, it is mainly to compare corresponding information in the structural feature of the second component with at least one of the following information in the structural feature of the first component: attributes such as a shape and curvature formed by at least one edge curve, the quantity of pixel points included in the at least one edge curve, a shape formed by edge key points, a curvature near the edge key points on the edge curve, and the like. If a comparison result of at least x pieces of information is that a difference between information in the structural feature of the first component and corresponding information in the structural feature of the second component is relatively large, for example, a difference between quantities of pixel points is greater than a preset value, the structural feature of the first component does not match the structural feature of the second component, where x is a natural number greater than 1.

Further, in a specific embodiment, the simultaneous localization and mapping apparatus may perform the matching in this step in a top-down matching manner as follows:

determining ranking values of the structural features of the first components and the structural features of the second components to be respectively function calculated values of lengths and edge key point quantities of corresponding edge curves; respectively ranking the structural features of the first components and ranking the structural features of the second components according to the ranking values; and sequentially matching the structural feature of each first component with the structural features of the second components according to a descending order of the ranking values.

Step 206. Simultaneously localize the image capturing apparatus according to the correspondence obtained in step 205.

A structural feature of one first component obtained in this embodiment of this application includes information about at least one edge curve and information about edge key points on the at least one edge curve, so that objects in an image are described more accurately, and matching between structural features of components is more reliable, thereby improving accuracy of simultaneous localization.

In other specific embodiments, when obtaining edge information of a current frame image, the simultaneous localization and mapping apparatus may obtain information about edge key points in the current frame image, so that structural features of first components in the current frame image are determined according to the information about the edge key points, thereby performing the foregoing matching operation and simultaneous localization operation according to the structural features of the first components. Details are not described herein.

Figure 4:
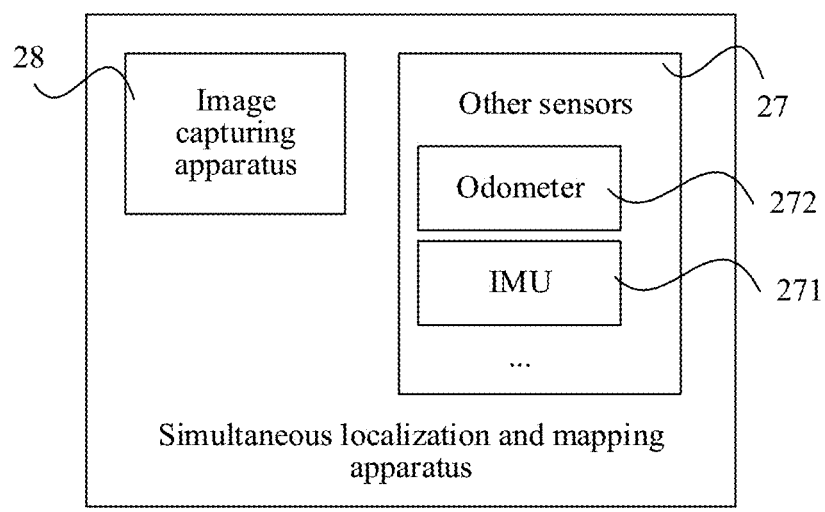
FIG. 4 is a schematic structural diagram of a simultaneous localization and mapping apparatus according to an application embodiment of this application.

The following describes a simultaneous localization and mapping method in this application by using a specific application instance. Referring to FIG. 4, in this embodiment, an image capturing apparatus 28, an odometer 272, or an IMU 271, or other sensors 27, are mounted on a simultaneous localization and mapping apparatus. Specifically, the simultaneous localization and mapping apparatus may be a robot. Specifically, the method in this embodiment of this application may be applied to, but is not limited to, the following item delivery scenario.

Figure 5:
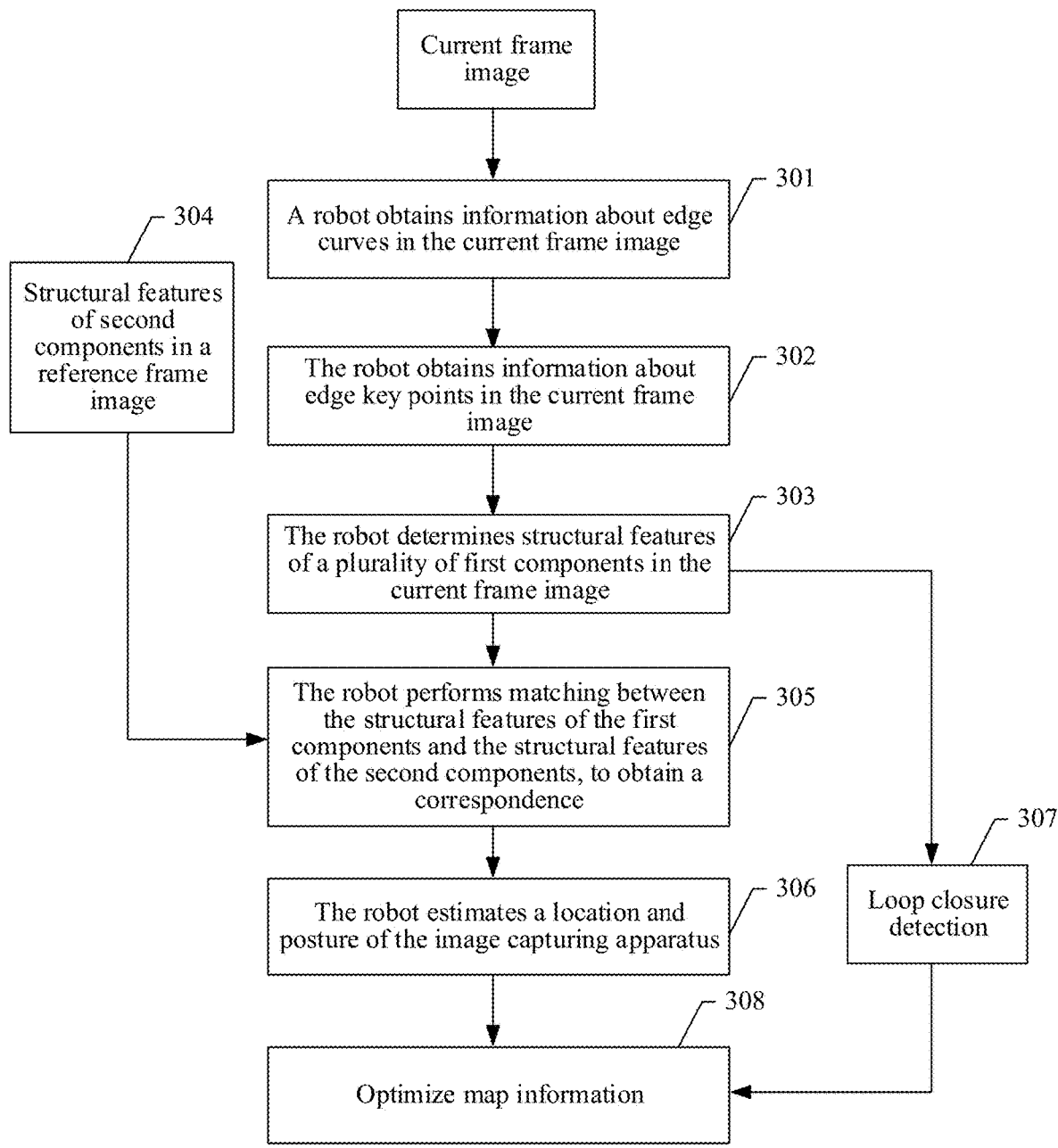
FIG. 5 is a flowchart of a simultaneous localization and mapping method according to an application embodiment of this application.

A user issues an item delivery task to the robot by using a client device, and the item delivery task includes a loading site and a delivery site of an item. After the robot receives the delivery task, the robot first positions itself to obtain the current site, and then plans a path according to a map and the delivery site. That is, the robot first plans a route from the current site to the loading site, and then plans a route from the loading site to the delivery site. In this way, in a process in which the robot moves according to the planned path, the robot needs to perform real-time localization according to images captured by the mounted image capturing apparatus, thereby controlling a speed and a turn direction, to ensure traveling along the planned route. In this embodiment, relying on the image capturing apparatus mounted on the robot, simultaneous localization of the robot may be performed by using a visual SLAM method based on edge information. Specifically, the robot may implement the visual SLAM method according to the following steps, and a flowchart is shown in FIG. 5, including:

Step 301. After the image capturing apparatus mounted on the robot captures a frame of image (that is, a current frame image), the robot performs edge detection on the current frame image, to obtain information about a plurality of edge curves in the current frame image, information about each edge curve including information such as coordinate information and a pixel value of each pixel point on the edge curve, and a shape of the edge curve.

Specifically, the robot may perform edge detection by using a detection algorithm such as Canny's algorithm.

Figure 6A:
FIG. 6a is a schematic diagram of a current frame image captured by an image capturing apparatus according to an application embodiment of this application.
Figure 6B:
FIG. 6b is a schematic diagram of edge curves in a current frame image according to an application embodiment of this application.

For example, FIG. 6a is a schematic diagram of a current frame image captured by the image capturing apparatus mounted on the robot, including objects such as a whiteboard, a pillar, a desk, a flower, a door, and a light. A plurality of edge curves shown in FIG. 6b may be obtained through the edge detection. The plurality of edge curves includes at least one edge curve on a contour line of each object, for example, an edge curve corresponding to a whiteboard on the left includes one closed four-side curve.

Step 302. The robot performs edge key point detection on the current frame image, where a detection algorithm such as Fast corner detection algorithm or Harris corner detection algorithm may be specifically used, to eventually obtain information about edge key points, such as coordinate information and pixel values of the edge key points. Each edge key point is a turning pixel point (such as an inflection point or a tangent line point) on a contour line and in an interior texture of each object included in the current frame image. In this way, all edge key points are located on the foregoing detected edge curves.

Figure 6C:
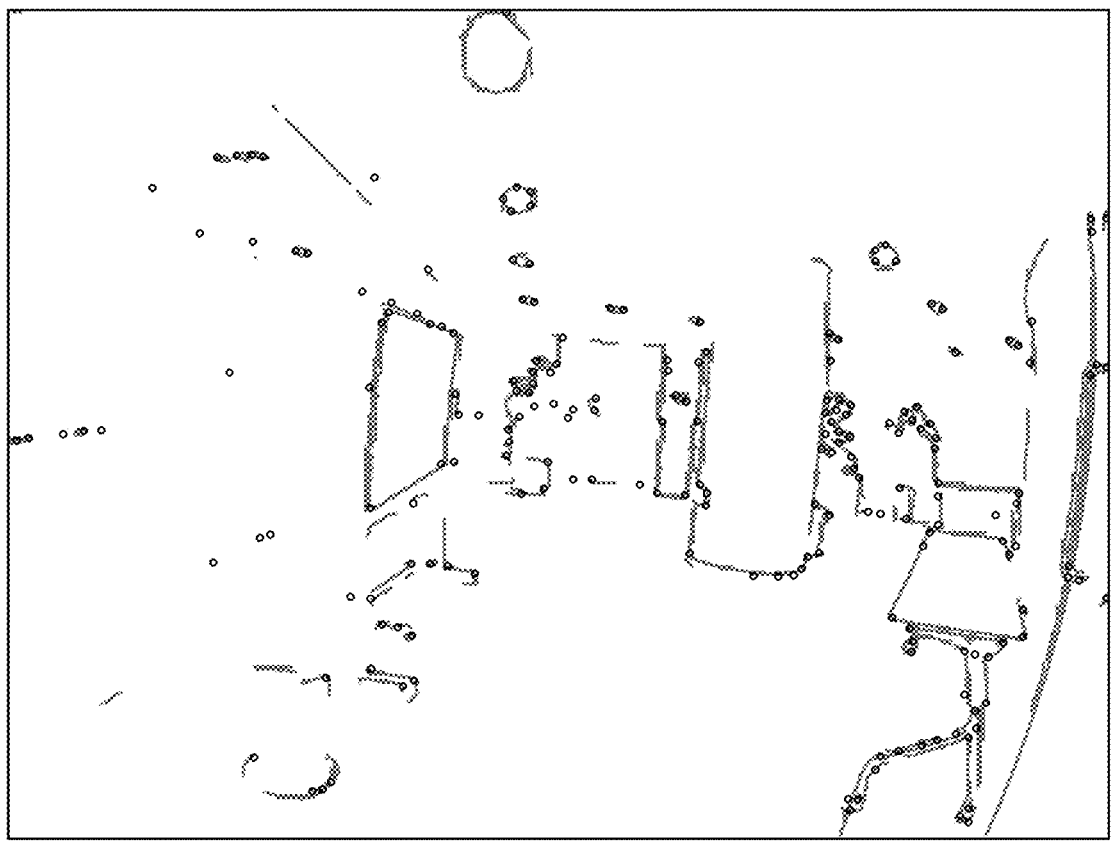
FIG. 6c is a schematic diagram of edge key points in a current frame image according to an application embodiment of this application.

For example, FIG. 6c shows the edge key points in the current frame image. In this figure, circles are used for representing the edge key points. The edge key points are inflection points, tangent line points, or the like on the foregoing edge curves. In FIG. 6c, one circle is used for representing one edge key point.

Step 303. The robot determines structural features of a plurality of first components in the current frame image according to the obtained information about the edge curves and information about the edge key points.

Figure 6D:
FIG. 6d is a schematic diagram of determining structural features of first components according to an application embodiment of this application.

Specifically, the robot may form a set by using information about each edge curve and information about edge key points on the edge curve, and use the set as a structural feature of one first component, to describe entire or partial structural information of an object in the current frame image. For example, as shown in FIG. 6d, the whiteboard on the left is described by using information about one closed edge curve and information about edge key points corresponding to the edge curve, and a complete rectangular structural information of the whiteboard is described. The desktop and the legs of the desk on the right are respectively described by using information about some incompletely closed edge curves and information about edge key points corresponding to the edge curves, and structural information of a partial irregular shape of the desk may be described. The pillar in the middle is also described by using information about some isolated and incompletely closed edge curves and information about edge key points corresponding to the edge curves, and partial structural information of the pillar may be described. In FIG. 6d, one circle is used for representing one edge key point.

In some cases, the robot may form a set by using information about a plurality of adjacent edge curves and information about edge key points on the plurality of adjacent edge curves and use the set as a structural feature of one first component. In this way, a loose connection relationship between edge curves may be established.

In this way, a part of an object in the current frame image is described by using a plurality of edge curves, additionally, a loose connection relationship between adjacent edge curves is established, to obtain a more complete description of an object. For example, as shown in FIG. 6d, a loose connection relationship is established between an edge curve of the desktop on the right and edge curves of the desk legs, and a structural feature of one component is formed, so as to completely describe the structure of the desk.

In addition, when objects are close to each other tightly in the space, an incorrect connection may occur. If static objects are connected, calculation in the visual SLAM method is not greatly affected. However, if a dynamic object is connected to a static object, the visual SLAM method is adversely affected. Therefore, only a loose connection relationship is established between edge curves, and in subsequent processing, the connection relationship may be torn down in some conditions.

Step 304. The robot obtains structural features of a plurality of second components in a reference frame image, where the second components may be specifically obtained according to the method in steps 301 to 303, or may be directly extracted from a local storage of the robot. The structural features of the second components stored in the local storage of the robot are obtained and stored into the storage when the procedure of this embodiment is initiated for the reference frame image.

Step 305. The robot performs top-down matching between the structural features of the first components and the structural features of the second components, to obtain a correspondence between the first components and the second components.

The robot first obtains ranking values corresponding to the structural features of the first components respectively.

The ranking value may be a function of a length of the edge curve in the structural feature of each first component and the quantity of edge key points, for example, the length of the edge curve, the sum of the length of the edge curves and the quantity of the edge key points. The robot obtains ranking values corresponding to the structural features of the second components respectively according to the same method.

Then, the structural features of the first components and the structural features of the second components are ranked and sorted according to the ranking values.

Finally, the structural features of the first components are matched with the structural features of the second components according to a descending order of the ranking values. In a case that a structural feature of a first component matches a structural feature of a second component, the first component and the second component correspond to each other, and are the same object.

In a case that a structural feature of a first component does not match a structural feature of any second component, it is possible that in the current frame image, a static object is connected to a dynamic object, therefore the structural feature of the first component includes excessive features. Or, it is possible that a part of the first component is beyond the image boundary of the current frame image. In this case, the robot may break the foregoing established loose connection. Specifically, the robot splits the structural feature of the first component into structural features of a plurality of split components, and the structural feature of each split component may include information about one edge curve or a plurality of edge curves.

Then, the robot inserts the structural features of the split components into a queue of the structural features of the first components, to wait for sequential matching.

Compared with an existing matching method based on point features or point-line features, in which matching needs to be performed on two feature sets each including tens of or hundreds of components, in the matching process in this embodiment, it only needs to perform matching between structural features of several or tens of components, so that a matching speed is greatly increased. Besides, a structural feature of each component can describe richer image information, so that a matching error rate is significantly reduced.

Step 306. The robot estimates a location and posture of the image capturing apparatus according to the obtained correspondence; specifically, the robot obtains motion information, such as a rotation parameter and a translation parameter, of the image capturing apparatus when the image capturing apparatus captures the reference frame image and the current frame image; and the robot obtains a current location of the image capturing apparatus according to map information.

It may be understood that, after performing step 303 to obtain the structural features of the first components, the robot may further perform loop closure detection in the following step 307 and visual mapping in step 308.

Step 307. The robot performs loop closure detection, that is, the robot obtains structural features of third components in a history key frame image, and matches the structural features of the third components with the structural features of the first components, to determine whether the robot has been to the current location before.

Specifically, in a case that structural features of at least t first components match structural features of third components in a history key frame image, it may be determined that the robot has been to the current location before, and step 308 is performed. If it is determined that the robot has never been to the current location before, the procedure ends.

Step 308. The robot optimizes map information in the local storage according to a loop closure detection result obtained in step 307; specifically, the robot may update the map information in the local storage according to the structural features of the first components in the current frame image.

There is no absolute sequence relationship between step 307 and steps 305 and 306, and the steps may be performed simultaneously or sequentially.

In this embodiment, structural features of components are used to describe an entire or partial structure of an object, and structural information of the whole scene is described by combining structural features of a plurality of components. Because the matching speed is high, the method in this embodiment may be used for site or location recognition.

Figure 7:
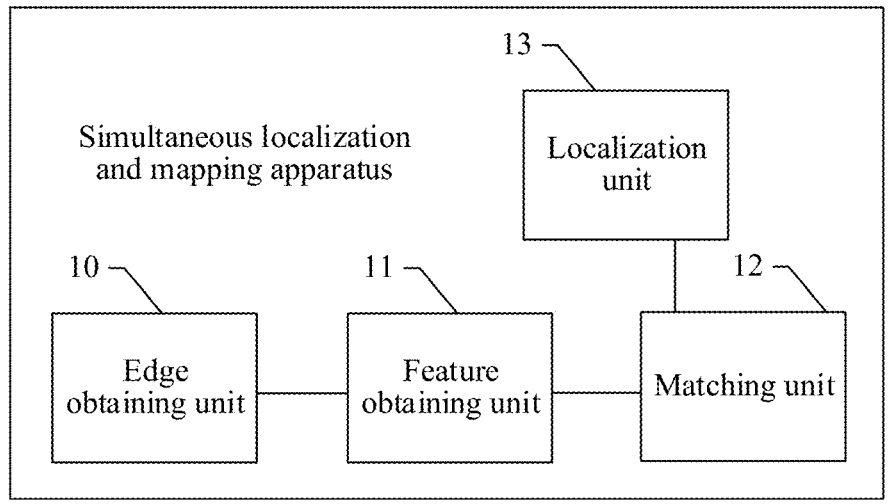
FIG. 7 is a schematic structural diagram of a computer device according to an embodiment of this application.

An embodiment of this application further provides a simultaneous localization and mapping apparatus. A schematic structural diagram of the simultaneous localization and mapping apparatus is shown in FIG. 7. The apparatus may specifically include:

an edge obtaining unit 10, configured to obtain edge information of a current frame image captured by an image capturing apparatus, the edge information including information about a plurality of edge curves and/or information about edge key points; and a feature obtaining unit 11, configured to determine structural features of first components in the current frame image according to the edge information obtained by the edge obtaining unit 10, a structural feature of each first component including information about at least one edge curve and/or information about edge key points on the at least one edge curve.

Specifically, the feature obtaining unit 11 may use information about one of the plurality of edge curves as a structural feature of one first component, or use information about a plurality of adjacent edge curves in the plurality of edge curves as a structural feature of one first component.

Further, the feature obtaining unit 11 is specifically configured to directly determine the structural features of the first components according to the edge information obtained by the edge obtaining unit 10, or may first perform pre-processing on the edge information, the pre-processing including removing edge information that does not satisfy a preset condition from the edge information, and then determine the structural features of the first components according to the pre-processed edge information.

The feature obtaining unit 11 is further configured to obtain structural features of second components in a reference frame image captured by the image capturing apparatus. The reference frame image is a previous frame image of the current frame image, or an $n^{th}$ frame image prior to the current frame image, n being greater than 1.

A matching unit 12 is configured to match the structural features of the first components obtained by the feature obtaining unit 11 with the structural features of the second components, to obtain a correspondence between the second components and the first components.

Specifically, the matching unit 12 is specifically configured to respectively match the structural feature of each first component with the structural features of the second component. In a case that a structural feature of a first component matches a structural feature of a second component, the first component corresponds to the second component. In a case that a structural feature of a first component does not match a structural feature of any second component, the matching unit 12 further splits the structural feature of the first component, to obtain structural features of a plurality of split components, and performs the matching operation on the structural feature of each split component.

When respectively matching the structural feature of each first component with the structural features of the second components, the matching unit 12 is specifically configured to determine that ranking values of the structural features of the first components and the structural features of the second components are respectively calculation values of corresponding edge information; respectively rank the structural features of the first components and rank the structural features of the second components according to the ranking values; and sequentially match the structural features of the first components with the structural features of the second components according to a descending order of the ranking values.

A localization unit 13 is configured to simultaneously localize the image capturing apparatus according to the correspondence obtained by the matching unit 12.

It may be seen that, a structural feature of one first component obtained by the feature obtaining unit 11 in this embodiment of this application includes information about at least one edge curve and/or information about edge key points on the at least one edge curve, so that objects in an image are described more accurately, and matching between structural features of components is more reliable, thereby improving accuracy of simultaneous localization. Furthermore, a structural feature of each first component may describe a partial structure of one object, or the structure of at least one object in the current frame image, and generally, one frame of image does not include many objects. Therefore, not many structural features of first components are obtained, and a calculation amount in the subsequent matching process is relatively low.

Figure 8:
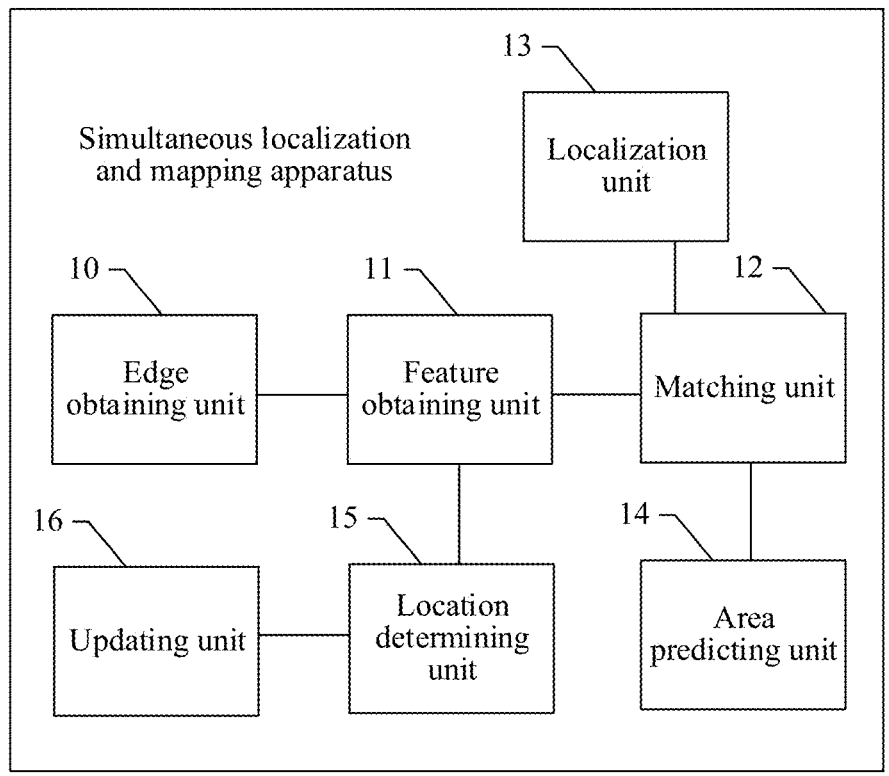
FIG. 8 is a schematic structural diagram of another computer device according to an embodiment of this application.

Referring to FIG. 8, in a specific embodiment, in addition to the structure shown in FIG. 7, the simultaneous localization and mapping apparatus may further include an area predicting unit 14, a location determining unit 15, and an updating unit 16.

The area predicting unit 14 is configured to obtain sensing information of sensors other than the image capturing apparatus; and predict, in the reference frame image according to the sensing information, areas of second components corresponding to the first components. In this way, the matching unit 12 is specifically configured to match the structural features of the first components with structural features of the second components in the predicted areas obtained by the area predicting unit 14.

The location determining unit 15 is configured to obtain structural features of third components in a history key frame image; match the structural features of the first components obtained by the feature obtaining unit 11 with the structural features of the third components, to obtain a matching result; and determine, according to the matching result, whether the image capturing apparatus has arrived at a current location before, to update map information in a local storage.

The matching result includes information about whether the structural features of the first components match structural features of third components in a history key frame image. In a case that structural features of at least t first components match structural features of third components in a history key frame image, it is determined that the image capturing apparatus has arrived at the current location before.

The updating unit 16 is configured to update the map information in the local storage according to the structural features of the first components in the current frame image in a case that the location determining unit 15 determines that the image capturing apparatus has arrived at the current location before. In a specific localization process, the localization unit 13 uses the map information updated by the updating unit 16.

Figure 9:
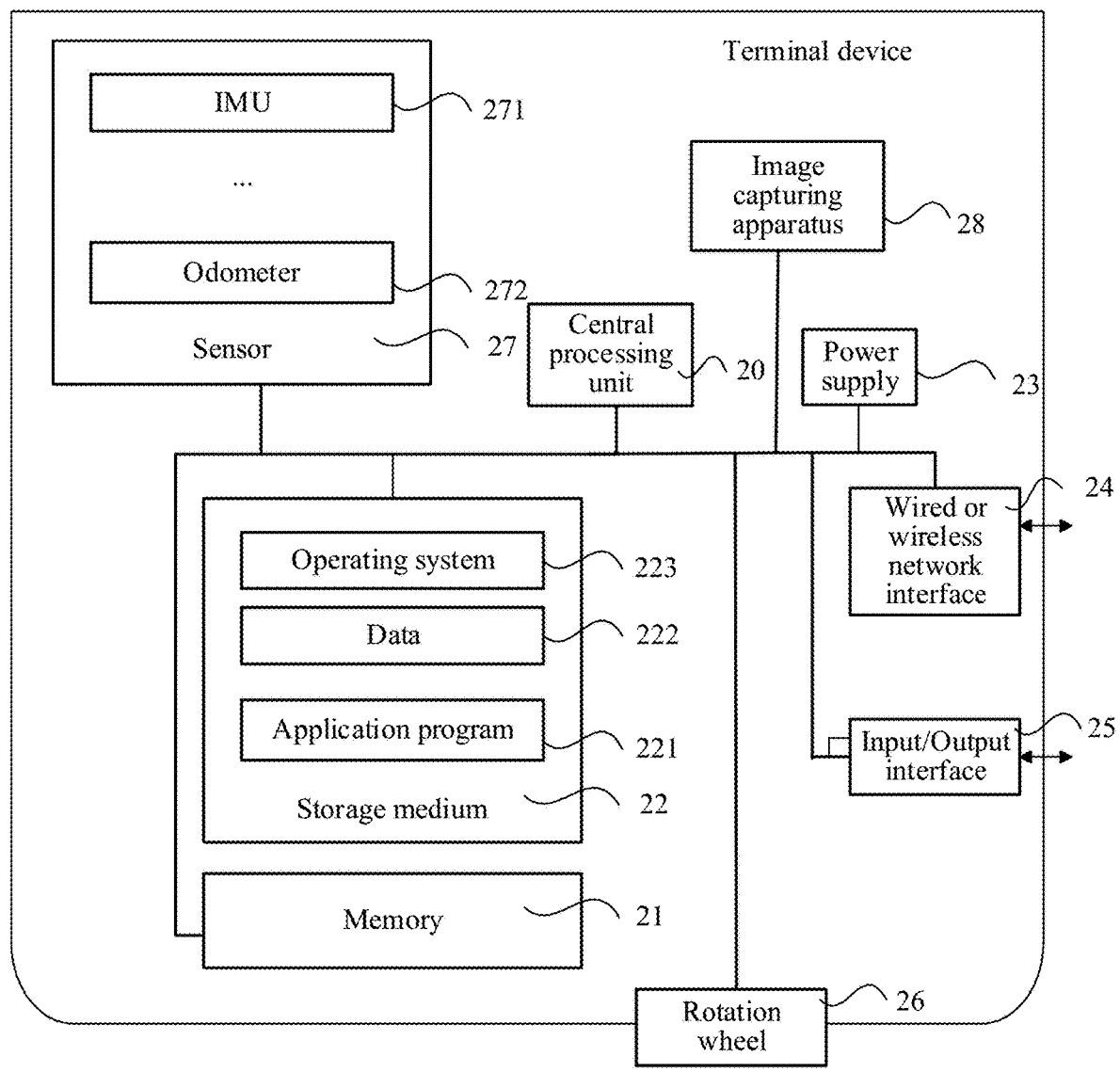
FIG. 9 is a schematic structural diagram of a terminal device according to an embodiment of this application.

An embodiment of this application further provides a terminal device. A schematic structural diagram of the terminal device is shown in FIG. 9. The terminal device may vary greatly due to different configurations or performance, and may include one or more central processing units (CPU) 20 (for example, one or more processors), a memory 21, and one or more storage mediums 22 (for example, one or more mass storage devices) that store application programs 221 or data 222. The memory 21 and the storage medium 22 may be transient or persistent storages. The program stored in the storage medium 22 may include one or more modules (not shown), and each module may include a series of instructions and operations for the terminal device. Further, the CPU 20 may be configured to communicate with the storage medium 22, and perform, on the terminal device, the series of instructions and operations in the storage medium 22.

Specifically, the application program 221 stored in the storage medium 22 includes a simultaneous localization and mapping application program, and the program may include the edge obtaining unit 10, the feature obtaining unit 11, the matching unit 12, the localization unit 13, the area predicting unit 14, the location determining unit 15, and the updating unit 16 in the foregoing simultaneous localization and mapping apparatus. Details are not described herein. Further, the CPU 20 may be configured to communicate with the storage medium 22, and perform, on the terminal device, a series of operations corresponding to the simultaneous localization and mapping application program stored in the storage medium 22.

The terminal device may further include one or more power supplies 23, one or more wired or wireless network interfaces 24, one or more input/output interfaces 25, and/or one or more operating systems 223, for example, Windows Server™, Mac OS X™, Unix™, Linux™, and FreeBSD™.

Steps performed by the simultaneous localization and mapping apparatus in the foregoing method embodiment may be based on the structure of the terminal device shown in FIG. 9.

Further, if the terminal device is applied to a smart sport device or smart moving device such as a robot, the terminal device may further include a rotation wheel 26. FIG. 9 is only a schematic diagram of a logical structure, and a real rotation wheel 26 generally has a shape of a circle, and is disposed at the bottom of the terminal device. The rotation wheel 26 may be in communication with the CPU 20. The CPU 20 may drive the rotation wheel 26 to rotate, and drive the terminal device to perform the foregoing simultaneous localization and mapping method.

The terminal device further includes an image capturing apparatus 28, such as a camera, and various sensors 27, such as an odometer 272, and an IMU 271, all connected to the storage medium 22 by using a bus. After capturing a frame of image, the image capturing apparatus 28 transmits the frame of image to the storage medium 22 for storage. In this way, the CPU 20 initiates the simultaneous localization and mapping method in this embodiment. After obtaining sensing information, each sensor 27 is configured to transmit the sensing information to the storage medium 22 for storage. In this way, in a process in which the CPU 20 executes the instructions of the simultaneous localization and mapping method, reference is made to the sensing information. A specific reference method is seen in the descriptions in the foregoing embodiments. Details are not described herein.

An embodiment of this application further provides a storage medium, the storage medium storing a plurality of instructions, the instructions being operable to be loaded by a processor to perform the simultaneous localization and mapping method performed by the simultaneous localization and mapping apparatus.

An embodiment of this application further provides a computer device, including a processor and a storage medium, the processor being configured to implement instructions.

The storage medium is configured to store a plurality of instructions, the instructions being configured to be loaded by a processor to perform the simultaneous localization and mapping method performed by the simultaneous localization and mapping apparatus.

A person of ordinary skill in the art may understand that all or some of the processes in the methods of the foregoing embodiments may be implemented by a computer-readable instruction instructing relevant hardware. The program may be stored in a non-volatile computer-readable storage medium. For example, in the embodiments of this application, the program may be stored in a non-volatile storage medium of a computer system, and is executed by at least one processor in the computer system, to implement the process including the foregoing method embodiments. The foregoing storage medium may be a magnetic disk, an optical disc, a read-only memory (ROM), a random access memory (RAM), or the like.

Technical features of the foregoing embodiments may be randomly combined. To make the description concise, not all possible combinations of the technical features in the foregoing embodiments are described. However, the combinations of the technical features shall be considered as falling within the scope recorded by this specification provided that no conflict exists.

The foregoing embodiments only describe several implementations of this application, which are described specifically and in detail, but cannot be construed as a limitation to the patent scope of the present disclosure. A person of ordinary skill in the art may make various changes and improvements without departing from the ideas of this application, which shall all fall within the protection scope of this application. Therefore, the protection scope of the patent of this application shall be subject to the appended claims.

What is claimed is:

1. A method for simultaneous localization and mapping implemented by a computer device, the method comprising:
   obtaining edge information of a current frame image captured by an image capturing apparatus, the edge information comprising at least one type of information about a plurality of edge curves and information about edge key points;
   determining structural features of first components in the current frame image according to the obtained edge information, a structural feature of each first component comprising at least one type of information about at least one edge curve and information about edge key points on the at least one edge curve;
   obtaining structural features of second components in a reference frame image captured by the image capturing apparatus according to edge information identified in the reference frame image;
   determining ranking values of the structural features of the first components and the structural features of the second components to be respectively calculated values of corresponding edge information;
   respectively ranking the structural features of the first components and ranking the structural features of the second components according to the ranking values; and
   sequentially matching the structural features of the first components with the structural features of the second components according to a descending order of the ranking values, and in a case that a structural feature of a first component matches a structural feature of a second component, obtaining a correspondence between the first component and the second component; and
   simultaneously localizing the image capturing apparatus according to the correspondence.

2. The method according to claim 1, wherein:
   after obtaining edge information of the current frame image captured by the image capturing apparatus, the method further comprises performing pre-processing on the obtained edge information, the pre-processing comprising removing information that does not satisfy a preset condition from the edge information; and
   determining the structural features of the first components in the current frame image according to the obtained edge information comprises: determining the structural features of the first components according to the pre-processed edge information.

3. The method according to claim 1, wherein determining the structural features of the first components in the current frame image according to the obtained edge information comprises:
   using information about one edge curve in the plurality of edge curves as a structural feature of one first component.

4. The method according to claim 1, wherein determining the structural features of the first components in the current frame image according to the obtained edge information comprises:
   using information about a plurality of adjacent edge curves in the plurality of edge curves as a structural feature of one first component.

5. The method according to claim 1, wherein the reference frame image is an $n^{th}$ frame image prior to the current frame image, and n is greater than or equal to 1.

6. The method according to claim 1, wherein before matching the structural features of the first components with the structural features of the second components, the method further comprises:
   obtaining sensing information of sensors other than the image capturing apparatus; and
   predicting, in the reference frame image according to the sensing information, areas of second components corresponding to the first components; and
   wherein matching the structural features of the first components with the structural features of the second components comprises matching the structural features of the first components with structural features of the second components in the predicted areas.

7. The method according to claim 1, further comprising:
   obtaining structural features of third components in a history key frame image, the history key frame image being at least one frame of image before the current frame image;
   matching the structural features of the first components with the structural features of the third components, to obtain a matching result;

determining, according to the matching result, whether the image capturing apparatus has been to a current location associated with the current frame image before; and updating map information in a local storage if it is determined that the image capturing apparatus has been to a current location before.

8. The method according to claim 7, wherein the matching result comprises information about whether the structural features of the first components match structural features of third components in a history key frame image; and wherein determining, according to the matching result, whether the image capturing apparatus has been to the current location before comprises: determining, in a case that the structural features of at least t first components match the structural features of third components in a history key frame image, that the image capturing apparatus has been to the current location before, wherein t is greater than or equal to 1.

9. The method according to claim 7, wherein updating the map information in the local storage comprises:

updating the map information in the local storage according to the structural features of the first components in the current frame image.

10. The method according to claim 1, further comprising:

splitting a structural feature of a first component in a case that the structural feature of the first component does not match a structural feature of any second component, to obtain structural features of a plurality of split components; and performing, for the structural features of the plurality of split components, an operation of matching the structural features of the plurality of split components with the structural features of the second components.

11. A computer device, comprising a processor and a memory, the memory storing computer-readable instructions, the computer-readable instructions, when executed by the processor, causing the processor to perform the following operations:

obtaining edge information of a current frame image captured by an image capturing apparatus, the edge information comprising at least one type of information about a plurality of edge curves and information about edge key points;

determining structural features of first components in the current frame image according to the obtained edge information, a structural feature of each first component comprising at least one type of information about at least one edge curve and information about edge key points on the at least one edge curve;

obtaining structural features of second components in a reference frame image captured by the image capturing apparatus according to edge information identified in the reference frame image;

determining ranking values of the structural features of the first components and the structural features of the second components to be respectively calculated values of corresponding edge information;

respectively ranking the structural features of the first components and ranking the structural features of the second components according to the ranking values; and sequentially matching the structural features of the first components with the structural features of the second components according to a descending order of the ranking values, and in a case that a structural feature of a first component matches a structural feature of a second component, obtaining a correspondence between the first component and the second component and simultaneously localizing the image capturing apparatus according to the correspondence.

12. The computer device according to claim 11, wherein after obtaining edge information of the current frame image captured by the image capturing apparatus, the processor further performs pre-processing on the obtained edge information, the pre-processing comprising removing information that does not satisfy a preset condition from the edge information; and wherein when the processor is configured to perform determining structural features of first components in the current frame image according to the obtained edge information, the processor is configured to perform determining the structural features of the first components according to the pre-processed edge information.

13. The computer device according to claim 11, wherein determining the structural features of the first components in the current frame image according to the obtained edge information comprises:

using information about one edge curve in the plurality of edge curves as a structural feature of one first component.

14. The computer device according to claim 11, wherein determining the structural features of the first components in the current frame image according to the obtained edge information comprises:

using information about a plurality of adjacent edge curves in the plurality of edge curves as a structural feature of one first component.

15. A non-transitory computer-readable storage medium, storing computer-readable instructions, the computer-readable instructions, when executed by one or more processors, causing the one or more processors to perform the following operations:

obtaining edge information of a current frame image captured by an image capturing apparatus, the edge information comprising information about a plurality of edge curves and/or information about edge key points;

determining structural features of first components in the current frame image according to the obtained edge information, a structural feature of each first component comprising information about at least one edge curve and/or information about edge key points on the at least one edge curve;

obtaining structural features of second components in a reference frame image captured by the image capturing apparatus according to edge information identified in the reference frame image;

determining ranking values of the structural features of the first components and the structural features of the second components to be respectively calculated values of corresponding edge information;

respectively ranking the structural features of the first components and ranking the structural features of the second components according to the ranking values; and sequentially matching the structural features of the first components with the structural features of the second components according to a descending order of the ranking values, and in a case that a structural feature of a first component matches a structural feature of a second component, obtaining a correspondence between the first component and the second component and simultaneously localizing the image capturing apparatus according to the correspondence.

16. The non-transitory computer-readable storage medium according to claim 15, wherein after obtaining edge information of the current frame image captured by the image capturing apparatus, the processor further performs the following operations: performing pre-processing on the obtained edge information, the pre-processing comprising removing information that does not satisfy a preset condition from the edge information; and wherein determining structural features of first components in the current frame image according to the obtained edge information comprises: determining the structural features of the first components according to the pre-processed edge information.

17. The non-transitory computer-readable storage medium according to claim 15, wherein determining structural features of first components in the current frame image according to the obtained edge information comprises:

using information about one edge curve in the plurality of edge curves as a structural feature of one first component.

18. The non-transitory computer-readable storage medium according to claim 15, wherein determining structural features of the first components in the current frame image according to the obtained edge information comprises:

using information about a plurality of adjacent edge curves in the plurality of edge curves as a structural feature of one first component.

* * * * *